C. A. GOOZEY.
VALVE HANDLE.
APPLICATION FILED DEC. 31, 1913.
1,113,613.
Patented Oct. 13, 1914.
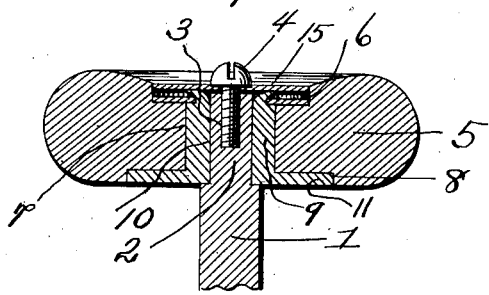
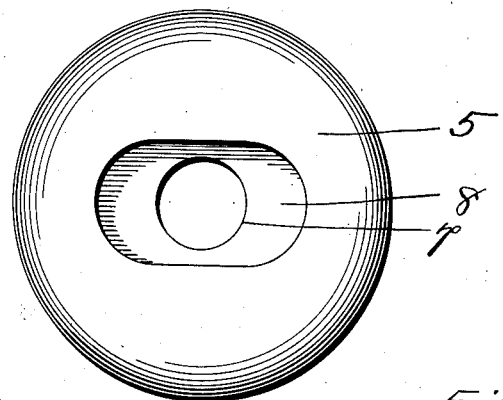
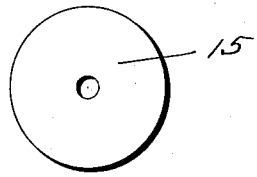
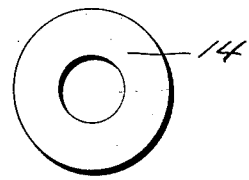
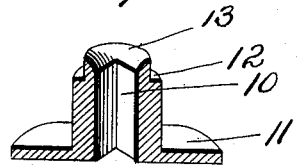
Witnesses
Inventor
C. A. Goozey.
By James J. Shuely & Co.,
Attorneys

UNITED STATES PATENT OFFICE.

CHARLES A. GOOZEY, OF WOONSOCKET, RHODE ISLAND.

VALVE-HANDLE.

1,113,613.  Specification of Letters Patent.  Patented Oct. 13, 1914.

Application filed December 31, 1913. Serial No. 809,765.

*To all whom it may concern:*

Be it known that I, CHARLES A. GOOZEY, citizen of the United States, residing at Woonsocket, in the county of Providence and State of Rhode Island, have invented new and useful Improvements in Valve-Handles, of which the following is a specification.

My present invention pertains to handles for use on valve stems and the like; and it contemplates the provision of a simple and compact construction calculated to effectually prevent lost motion between the handle and the stem after use for a short period.

The invention will be fully understood from the following description and claims when the same are read in connection with the drawing, accompanying and forming part of this specification, in which:

Figure 1 is a diametrical section of my novel construction. Fig. 2 is an inverted plan of the handle. Fig. 3 is a diametrical section of the metallic sleeve, showing the bore, of angular form in cross-section, therein. Figs. 4 and 5 are plan views of the washers employed.

Similar numerals of reference designate corresponding parts in all of the views of the drawing.

The valve stem 1 is provided with the reduced end portion 2 of angular form in cross-section, and in said end portion a threaded bore 3 is formed to receive the fastening screw 4. The handle 5 may be made of wood, fiber, composition or any other material compatible with its purpose, and is preferably, though not necessarily, of circular form in outline with a depression 6 formed in its upper or outer side. It is provided at 7 with a central bore, and is peculiar in that said bore merges at its lower or inner end in a countersink 8 that is formed in the inner or lower side of the handle; said countersink being of a greater length than it is wide.

Disposed in the bore 7 of the handle is a metallic sleeve 9. The said sleeve is provided with an angular bore 10 and is provided at its inner end with a flange 11 of a shape and size to snugly occupy the countersink 8 of the handle. At its upper or outer end, the sleeve 9 is shouldered and reduced as indicated by 12 and 13, the shoulder being designed to rest flush with the bottom of the outer depression in the handle 5 and afford an abutment for an apertured metallic washer 14, and the reduced portion 13 being designed to be turned over against the outer side of the said washer after the manner shown in Fig. 1. After the handle has been properly placed on the stem 1, a metallic washer 15 is arranged in the depression 6 of the handle and against the end 13 of sleeve 9, after which the fastening screw 4 is turned through the said washer 15 and into the bore 3 of the stem, when the handle will be securely and strongly fixed on the stem.

It will be gathered from the foregoing that by virtue of my novel construction, the handle is strongly held against turning on the stem, and hence there is no liability of the handle working loose relative to the stem after a short period of use and giving rise to lost motion.

The sleeve 9, may when desired be exteriorly of angular form in cross-section without affecting my invention. I would also have it understood that the flange 11 and the countersink 8 may be of the angular shape illustrated, or of any other shape compatible with the purpose of my invention without departure from the scope of the same as claimed.

Having described my invention, what I claim and desire to secure by Letters-Patent, is:

1. The combination of a stem having a reduced end portion of angular form in cross-section and also having a threaded bore in said end portion, a handle having a countersink of greater length than width in its inner side and also having a bore in communication with said countersink, a metallic sleeve occupying said bore and having a flange of a shape and size to snugly occupy said countersink and also having a bore of angular form in cross-section receiving the angular portion of the stem and further having a shoulder and a reduced end portion, a washer arranged on said shoulder and in the outer portion of the handle and secured in position by the outer end portion of the metallic sleeve, a second washer arranged against the outer end of the sleeve, and a screw passed through the second-named washer and into the threaded bore of the stem.

2. A stem handle comprising a body having a central opening and also having a depression in its outer side and a countersink in its inner side in communication with said opening, a metallic sleeve arranged in the central opening in the body and having a flange snugly occupying said countersink, a washer secured on the sleeve and arranged in said depression, and a washer arranged over the first-named washer and the end of the sleeve and connected with the sleeve.

In testimony whereof I have hereunto set my hand in presence of two subscribing witnesses.

CHARLES A. GOOZEY.

Witnesses:
 WILLIAM H. HOUGHTON,
 EDGAR L. SPAULDING.